United States Patent
Sun

(10) Patent No.: US 8,744,355 B2
(45) Date of Patent: Jun. 3, 2014

(54) COMMUNICATION METHOD, AND BLUETOOTH DEVICE UTILIZING THE COMMUNICATION METHOD

(75) Inventor: Juei-Ting Sun, Kaohsiung (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 150 days.

(21) Appl. No.: 13/209,432

(22) Filed: Aug. 14, 2011

(65) Prior Publication Data

US 2013/0040575 A1 Feb. 14, 2013

(51) Int. Cl.
*H04B 7/00* (2006.01)
*H04W 4/00* (2009.01)
*H04W 84/18* (2009.01)
*H04W 84/20* (2009.01)
*H04W 92/02* (2009.01)

(52) U.S. Cl.
CPC .............. *H04W 84/18* (2013.01); *H04W 84/20* (2013.01); *H04W 92/02* (2013.01)
USPC ........ 455/41.2; 455/552.1; 370/328; 370/338

(58) Field of Classification Search
CPC . H04W 84/18; H04W 84/20; H04W 72/1257; H04W 92/02
USPC ................. 455/41.1, 41.2, 552.1, 553.1, 561; 370/328, 338
See application file for complete search history.

(56) References Cited

U.S. PATENT DOCUMENTS

| | | | | |
|---|---|---|---|---|
| 6,480,505 | B1 * | 11/2002 | Johansson et al. | 370/449 |
| 2002/0167961 | A1 * | 11/2002 | Haartsen | 370/444 |
| 2002/0176412 | A1 * | 11/2002 | Racz et al. | 370/389 |
| 2004/0047319 | A1 * | 3/2004 | Elg | 370/338 |
| 2004/0210875 | A1 * | 10/2004 | Linde | 717/127 |
| 2005/0136835 | A1 * | 6/2005 | Suwa | 455/11.1 |
| 2006/0183423 | A1 * | 8/2006 | Johansson et al. | 455/41.2 |
| 2006/0198337 | A1 * | 9/2006 | Hoang et al. | 370/329 |
| 2008/0144645 | A1 * | 6/2008 | Russell et al. | 370/412 |
| 2009/0219885 | A1 * | 9/2009 | Lin | 370/330 |

OTHER PUBLICATIONS

G. Zussman et al, "Bluetooth Time Division Duplex—Exact Analysis as a Polling System", CCIT Report 414, Technion-Dept. of Elec. Engr, Feb. 2003.*

* cited by examiner

*Primary Examiner* — Duc M Nguyen
(74) *Attorney, Agent, or Firm* — Winston Hsu; Scott Margo

(57) ABSTRACT

A communication method for a Bluetooth device in a scatternet which may include several piconets is proposed. The method includes transmitting data to a peer device in the first piconet, determining whether there is any buffered data to be transmitted to the peer device in the first piconet, and switching from the first piconet to the next piconet to transmit data to a peer device in the second piconet according to the determination result.

10 Claims, 9 Drawing Sheets

(a)

(b)

COMMUNICATION METHOD, AND BLUETOOTH DEVICE UTILIZING THE COMMUNICATION METHOD

BACKGROUND

The present application relates to a communication method and a Bluetooth device utilizing the communication method, and particularly relates to a communication method that can maximize the use efficiency of Bluetooth slots in the scatternet, and a Bluetooth device utilizing the communication method.

FIG. 1 is a schematic diagram illustrating a related art Bluetooth devices in a scatternet. In FIG. 1, the headset 101, the mobile phone 103 and the mobile phone 105 all include a Bluetooth device therein. Accordingly, the mobile phone 103 can transmit data to the headset 101 or receive data from the headset 101 via the Bluetooth devices therein. Such communication relation is named a piconet (herein after piconet A and phone 103 is the master). Simultaneously, the mobile phone 103 and 105 can utilize Bluetooth devices therein to communicate with each other. Such communication relation is also named a piconet (herein after piconet B and phone 103 is the slave). Therefore, phone 103 has a scatternet (Master of the piconet A and slave of the piconet B).

FIGS. 2 and 3 are schematic diagrams illustrating the switching operations between two piconets in the scatternet. According to the specification of Bluetooth, the piconet clock is aligned to the master native clock. So, a device in a scatternet cannot service two piconets at the same time. Each transmission period for each piconet includes a predetermined data capacity (ex. 80 slots), depending on the chip design. In FIG. 2, all the slots in the piconet A are utilized to transmit data (such as the marked $D_1$, $D_2$) and null packets (such as the marked $N_1$, $N_2$). When amount of the data to be transmitted for the piconet A is larger than the data capacity of the transmission period for the piconet A, it needs to wait for 80 slots until the operations are switched back to piconet A, which may cause quality degradation. FIG. 3 is a schematic diagram illustrating that only parts of the slots in the piconet A are utilized. That is, no data of the piconet A needs to be transmitted or all the data needs to be transmitted for the piconet A are already transmitted. In this case, the empty slots may be filled with null packets such as $N_A$, $N_B$ from the slave device and poll packets such as $P_A$, $P_B$ from the master device, as shown in FIG. 3, or without any traffic, as shown in FIG. 4. However, such mechanism may cause unnecessary data transmission or waste the air bandwidth since the slots are not sufficiently utilized.

SUMMARY OF THE INVENTION

Accordingly, one objective of the present application is to provide a communication method than can increase or optimize Bluetooth slots utilization efficiency.

The present invention provides a communication method for a Bluetooth device in a scatternet which may include several piconets. The method comprises transmitting data to a peer device in the first piconet, determining whether there is any buffered data to be transmitted to the peer device in the first piconet, and switching from the first piconet to the next piconet to transmit data to a peer device in the second piconet according to the determination result.

The present invention further provides a Bluetooth device comprises a radio module and a control unit. The radio module is utilized to transmit data to a peer device in a first piconet, and the control unit is utilized to determine whether there is any buffered data to be transmitted to the peer device in the first piconet, and control the radio module to switch to the next piconet to transmit data to a peer device in the second piconet according to the determination result.

The present invention further provides a Bluetooth master device, configured to send poll packets to the slave device in the first piconet if there is not any data to be transmitted. As receiving any valid packet from the slave, it can switch to the next piconet as soon as possible.

The present invention further provides a Bluetooth slave device, configured to be forced to respond a null packet to the master device in the first piconet if there is not any packet to be transmitted when receiving any valid packet from the master device. Then, it can switch to the next piconet as soon as possible.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ".

To increase the use efficiency of Bluetooth slots, whether there is any buffered data to be transmitted to the peer Bluetooth device is checked, and the transmission operations are then configured accordingly. For example, when there is no buffered data to be transmitted within piconet A (e.g. the data transmission within the piconet A is finished), the transmission is switched from piconet A to piconet B immediately or after exchanging at least one indicator with the peer device in piconet A (e.g. a poll/null or a null/null packet exchange). In other words, slots for piconet A/piconet B are allocated according to whether there is any buffered data to be transmitted. Moreover, redundant poll and null packets exchange may be removed, thereby further increasing the efficiency.

Figure 5A:
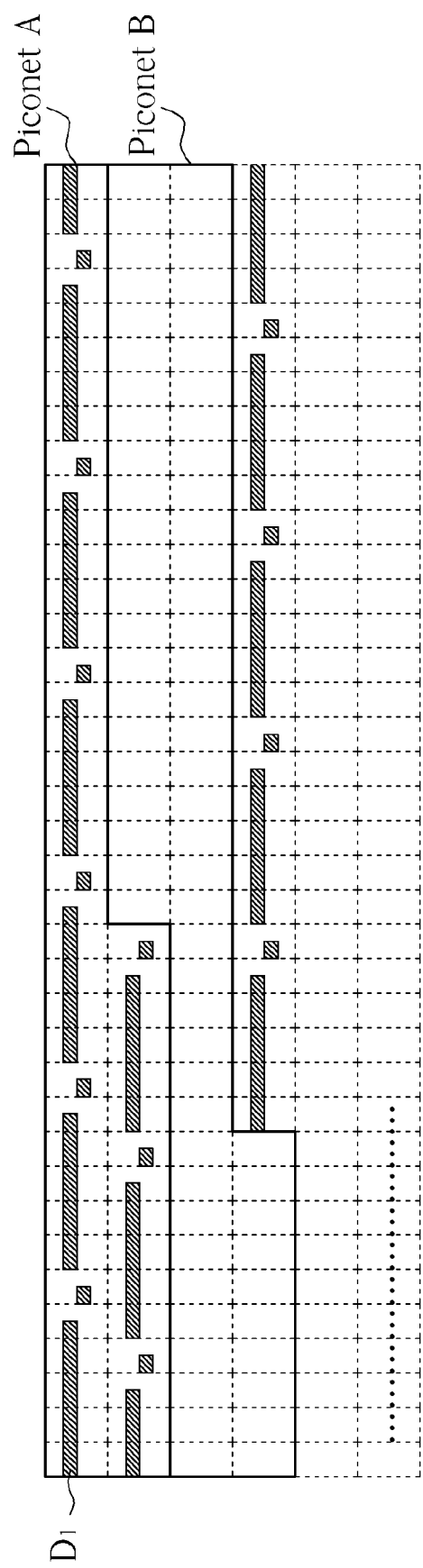
FIGS. 5A, 5B and 6 are schematic diagrams illustrating the switching operations between two piconets in the scatternet according to embodiments of the present application.
Figure 5B:
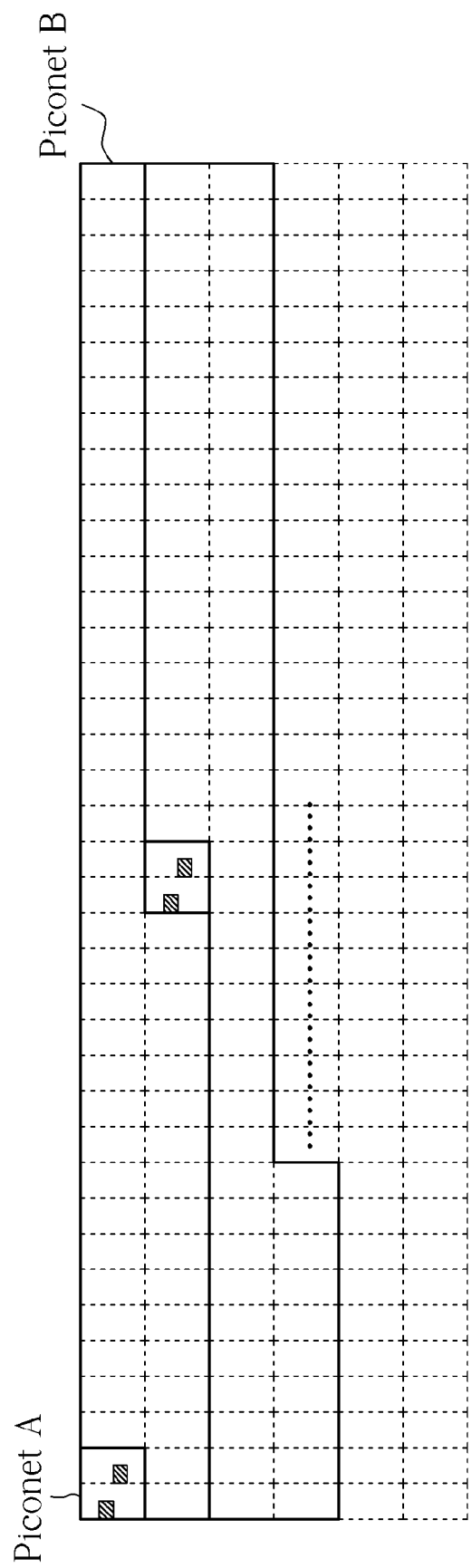
Figure 6:
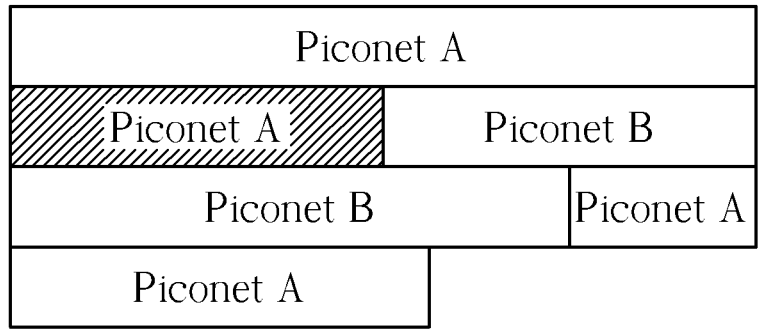
Figure 6:
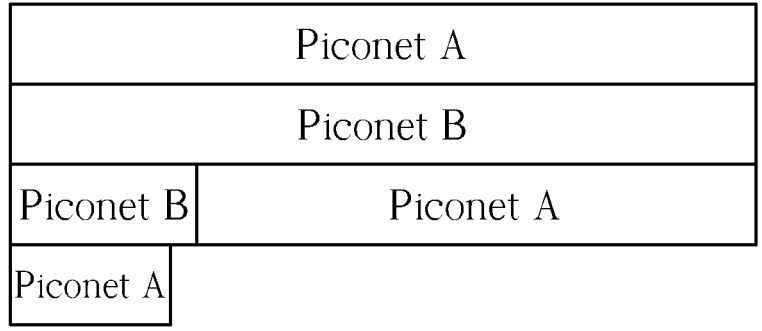
Figure 8:
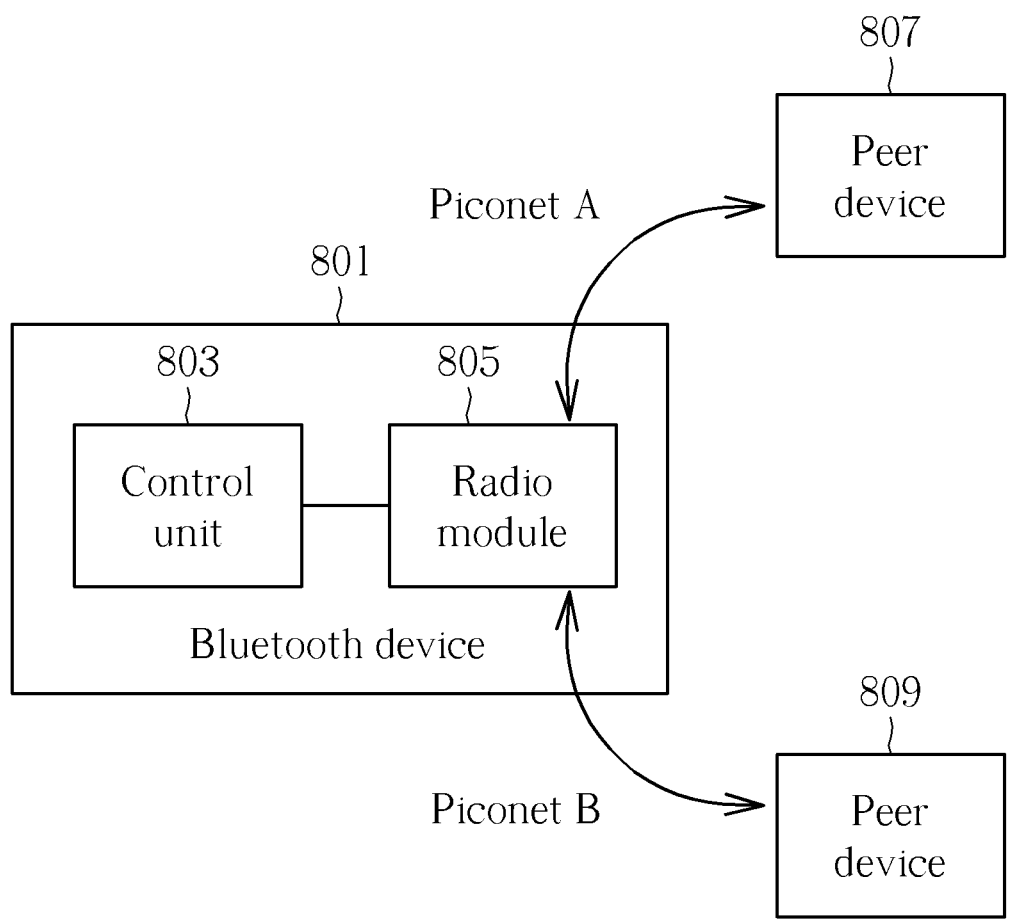
FIG. 8 is a block diagram illustrating a Bluetooth device 801 according to one embodiment of the present application.

Please refer to FIG. 5-6 in conjunction with FIG. 8. FIGS. 5-6 are schematic diagrams illustrating the switching operations between two piconets in the scatternet according to embodiments of the present application. FIG. 8 is a block diagram illustrating a Bluetooth device 801 according to one embodiment of the present application. However, it should be understood that the present application is not limited to two piconets; the communication methods described in the following paragraphs are also suitable for three or more piconets. As shown in FIG. 8, the Bluetooth device 801 includes a control unit 803 and a radio module 805. The radio module 805 is utilized to transceive data to a peer device 807 in the piconet A and a peer device 809 in the piconet B. In one example, the Bluetooth device 801 can be provided in the mobile phone 103 in FIG. 1. The peer device 807 can be provided in the headset 101 in FIG. 1. Also, the peer device 809 can be provided in the mobile phone 105 in FIG. 1. However, please note that the Bluetooth device 801, the peer devices 807, 809 are not limited to be provided in the system shown in FIG. 1. They can be provided to any other system. The control unit 803 determines whether there is any buffered data to be transmitted to the peer device 807, and controls the radio module 805 to switch to the piconet B to transmit data to the peer device 809 according to the determination result. In one embodiment as shown in FIG. 5A, once no data of the piconet A needs to be transmitted or all the data of the piconet A needs to be transmitted are already transmitted, the Bluetooth device 801 is switched from the piconet A immediately to the piconet B. Or, as shown in FIG. 5B, after at least one pair of packets exchanged (e.g. a poll/null exchange to prevent from the link connection timeout) if there is no buffered data to be transmitted to the peer device, the Bluetooth device 801 is switched from the piconet A immediately to the piconet B. By this way, the slots occupied by redundant poll/null packets or empty slots can be utilized to transmit the data in piconet B.

Figure 3:
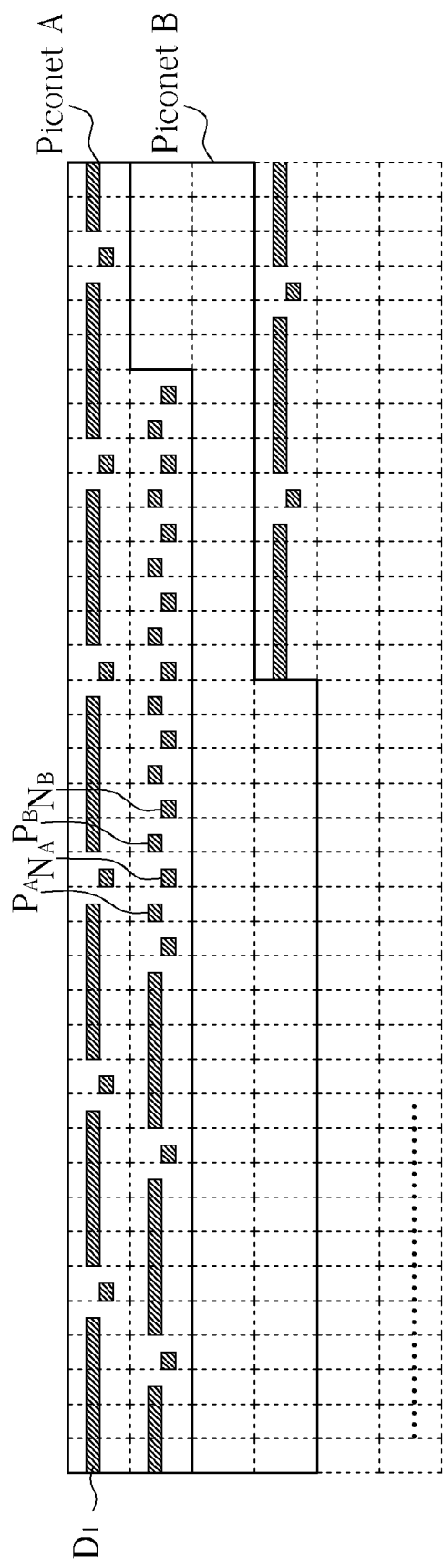
Figure 4:
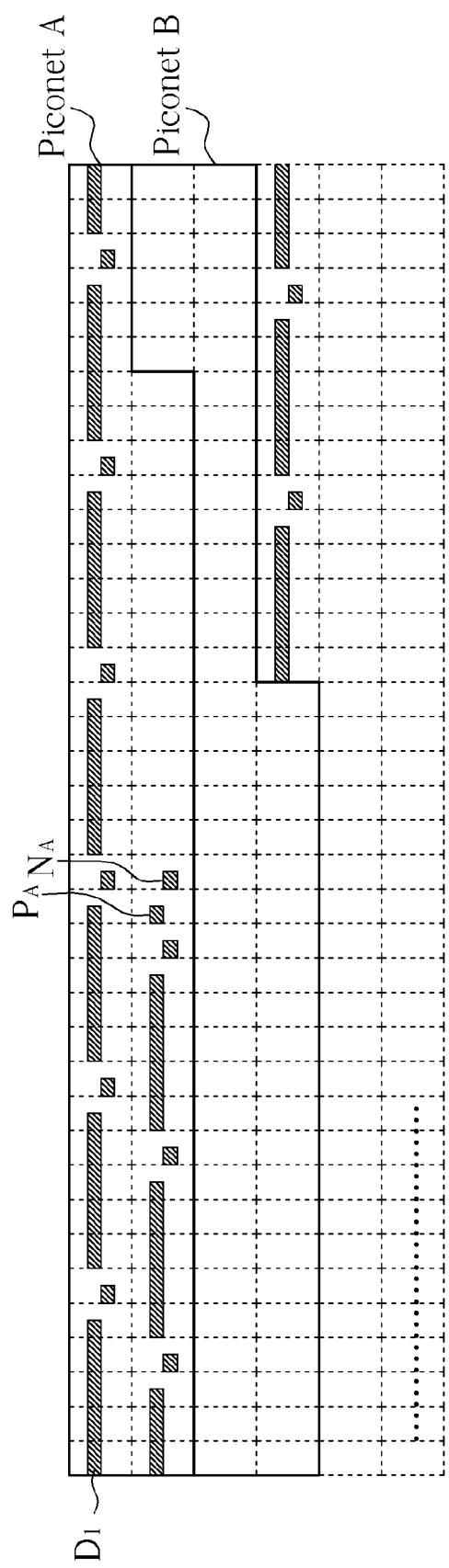

FIGS. 6 (a) and 6 (b) again illustrate the operation shown in FIGS. 3, 4 and 5. The slots initially are occupied by redundant poll/null packets or empty slots (the region marked by oblique lines) as shown in FIG. 6 (a). In FIG. 6 (b), the redundant poll/null packets or empty slots no longer exist and the redundant slots are allocated to piconet B when the data transmission with piconet A is finished, such that the slots can be utilized for the piconet B, thus the slots utilization efficiency is optimized.

Moreover, the time period for exchange the indicator (e.g. the poll packet and the null packet) can be decreased. When the Bluetooth device 801 acts as the master, if there is no buffered data to be transmitted, it can send poll packets immediately regardless of the original poll packet transmitting time period $T_{poll}$, that is defined as the maximum time between transmissions from the master to a particular slave on the ACL logical transport. Then, the switching operation can be performed without waiting for too much time. In addition, during the packet exchange operation, the master device may be forced to send poll packets to the slave device constantly until receiving the response from the slave, so as to accelerate the packet exchange since the slave device is defined to respond a null packet once it receives a poll packet. In this embodiment, at least one pair of packet exchange (poll/null, poll/LMP or poll/L2CAP pair) is needed to maintain the connection of the piconet A. However, in some embodiments, the piconet may need no poll/null packets to maintain the connection, thus the switching operation from the piconet A to the piconet B can be performed without the limitation that the first pair of packet exchange occurs.

In related art, if a slave device receives a null packet from a master device, the slave device can respond a null packet, a LMP packet, a L2CAP packet or respond no information. However, in one embodiment of the present application, the slave device can be forced to consequently respond a null pack even if receives a null packet from a master device. In this case, the piconet B is immediately switched to the piconet A after responding a null packet to the master.

Figure 1:
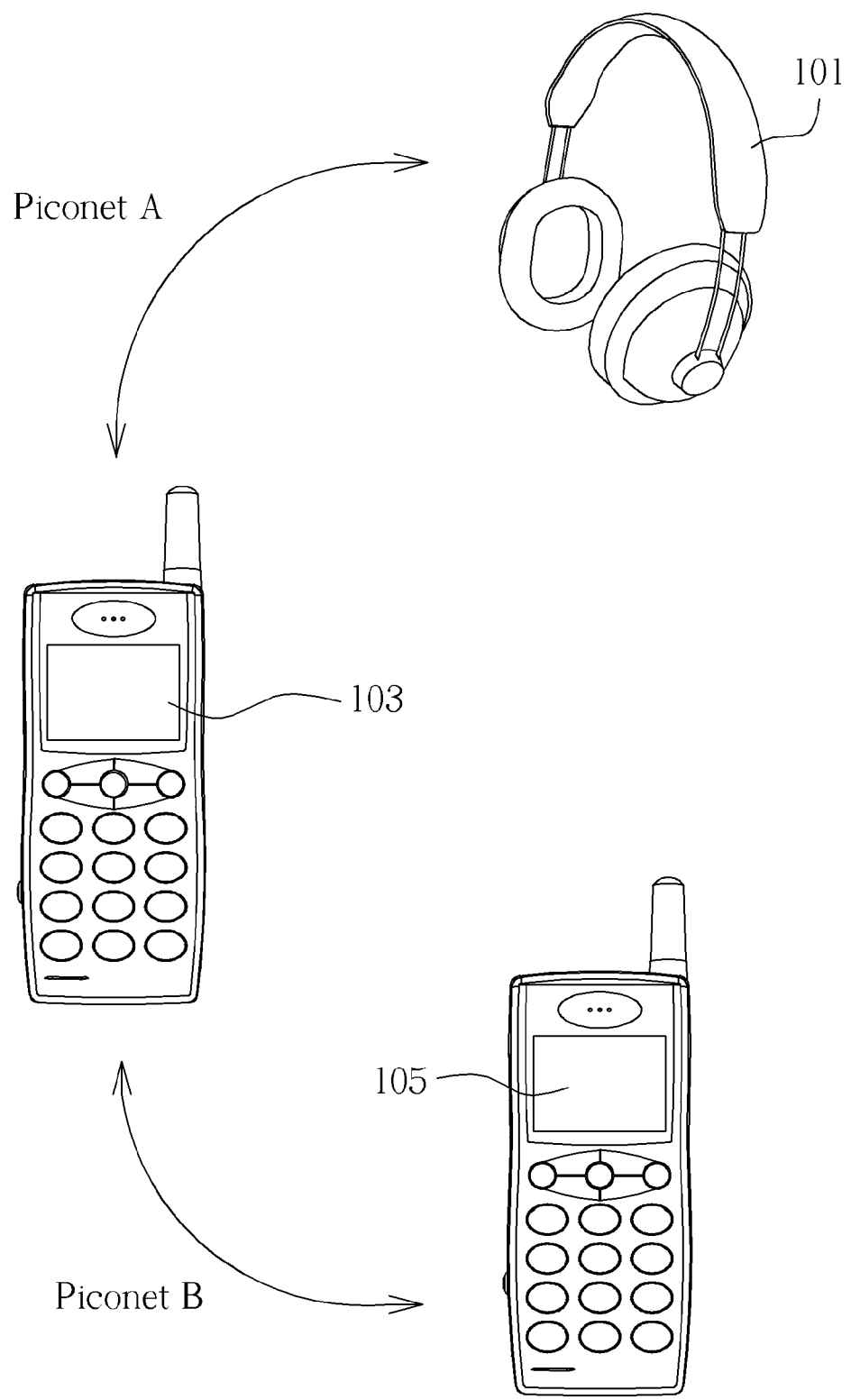
FIG. 1 is a schematic diagram illustrating a related art Bluetooth devices in a scatternet.
Figure 2:
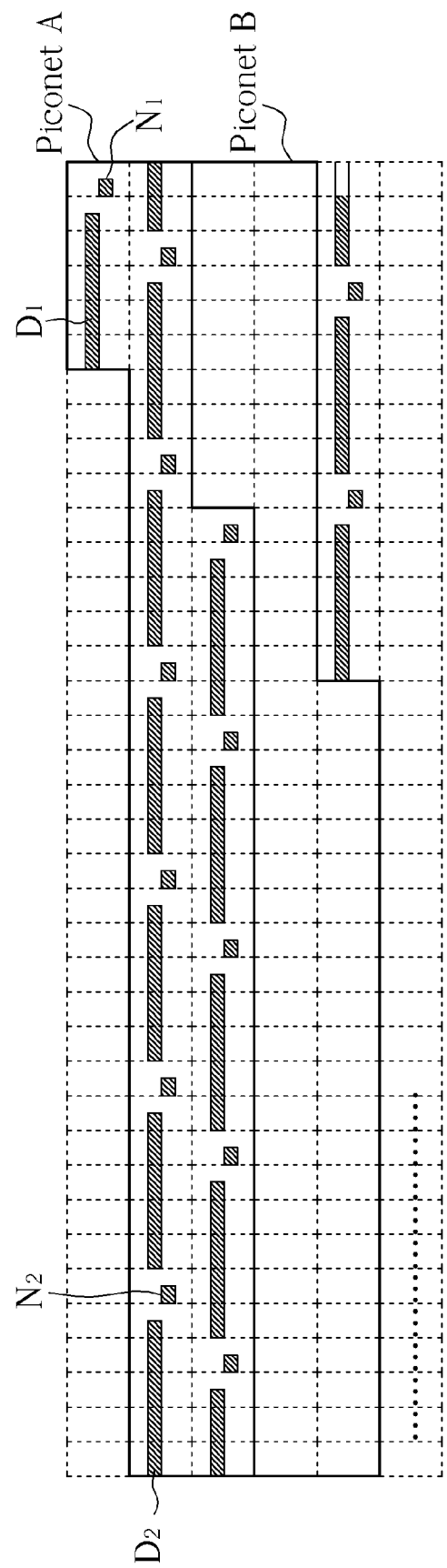
FIGS. 2, 3 and 4 are schematic diagrams illustrating the switching operations between two piconets in the scatternet.

Additionally, in another embodiment, data transmitting throughput in the piconet A (in FIG. 1, the mobile phone 103 to the headset 101) can be guaranteed, since the voice quality (the data from the mobile phone 103 to the headset 101) is mostly concerned in the piconet A shown in FIG. 1. By this way, the quality of voice data can be further increased. In this case, the data transmitting throughput can also be selectively increased. Such embodiments can be summarized as: determining a type of the buffered data (i.e. determining if the buffered data is important (for example, a real-time application) or not); switching from the first piconet to the next piconet according to the determination result and the determined type. Also, the embodiments disclosed in this paragraph can be summarized as: determining a type of the buffered data; allocating slots for the first piconet or the next piconet according to the determination result. In this embodiment, the allocating step can comprise: increasing slots for the first piconet when the data to be transceived comprises real-time application packets (ex. voice data).

Figure 7:
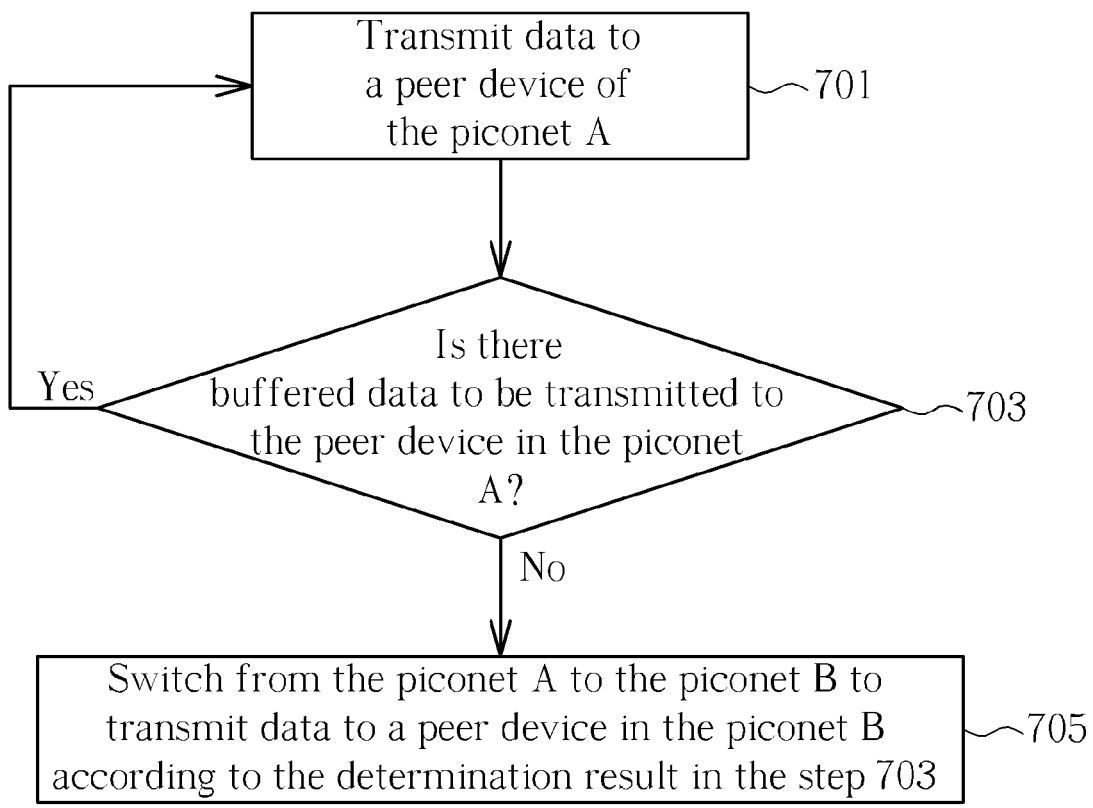
FIG. 7 is a flow chart illustrating the steps of a communication method according to one embodiment of the present application.

According to above-mentioned embodiments, a communication method can be acquired as below. FIG. 7 is a flow chart illustrating the steps of a communication method according to one embodiment of the present application. The communication method shown in FIG. 7 includes the steps of:

Step 701

Transmit data to a peer device in the piconet A.

Step 703

Determine whether there is any buffered data to be transmitted to the peer device in the piconet A. If yes, go to the step 701. If not, go to the step 705.

Step 705

Switch from the piconet A to the piconet B to transmit data to a peer device in the piconet B according to the determination result in the step 703. In another embodiment, the concept of the step 705 can be replaced by: allocating slots for the first piconet or the second piconet according to the determination result.

Other detail steps of the communication method can be obtained according to above-mentioned embodiments, thus it is omitted for brevity here.

In view of above-mentioned embodiments, the efficiency of Bluetooth slots can be optimized. By this way, if there is no buffered data to be sent and at least a packet exchange is completed, another piconet can be serviced immediately. Some programs or instructions can be written in a control unit to perform above mentioned steps. Additionally, the programs or instructions can be written in a computer readable medium such as an optical disc or a hard disk, to perform above mentioned steps.

Via above mentioned embodiments, the Bluetooth device slots can be efficiently utilized, because another piconet can be serviced immediately if there is no buffered data to be sent and at least a packet exchange is completed in the current piconet.

Those skilled in the art will readily observe that numerous modifications and alterations of the device and method may be made while retaining the teachings of the invention.

What is claimed is:

1. A communication method for a Bluetooth device in a scatternet including a first piconet and a second piconet, wherein the first piconet comprises a first master device, and the second piconet comprises a second master device different from the first master device, comprising:
transmitting data to a peer device in the first piconet;
determining whether there is any buffered data to be transmitted to the peer device in the first piconet;

switching from the first piconet to the second piconet to transmit data to a peer device in the second piconet according to the determination result; and exchanging at least one packet with the peer device in the first piconet before switching to the second piconet to prevent from link connection timeout if there is no buffered data to be transmitted to the peer device.

2. The communication method of claim 1, wherein the exchanging step comprises:

when acting as a master device, sending poll packets regardless of original poll interval until receiving a response if there is no buffered data to be transmitted to the slave.

3. The communication method of claim 1, wherein the exchanging step comprises forcing the Bluetooth device to transmit a poll packet to the peer device when the Bluetooth device acts as a master device.

4. The communication method of claim 1, wherein the exchanging step comprises forcing the Bluetooth device to respond a null packet to the peer device even if the Bluetooth device receives a null packet when acting as a slave device.

5. The communication method of claim 1, wherein the switching step comprises switching from the first piconet to the second piconet when data transmission within the first piconet is finished.

6. The communication method of claim 1, wherein the switching step comprises switching from the first piconet to the second piconet when there is no buffered data to be transmitted to the peer device in the first piconet and at least one packet exchange is completed.

7. The communication method of claim 1, further comprising:

increasing data transmitting throughput to guarantee the packet can be sent to the peer device on time.

8. A communication method for a Bluetooth device in a scatternet including a first piconet and a second piconet, comprising:

transceiving data to a peer device in the first piconet;
determining a type of the data to be transceived; and
allocating slots for the first piconet or the second piconet to be a specific number if the data to be tranceived is a specific type, wherein the step of allocating slots for the first piconet or the second piconet comprising: increasing slots for the first piconet when the data to be transceived comprises real-time application packets.

9. A communication method for a Bluetooth device in a scatternet including a first piconet and a second piconet, comprising:

transmitting data to a peer device in the first piconet;
determining whether there is any buffered data to be transmitted to the peer device in the first piconet; and
switching from the first piconet to the second piconet to transmit data to a peer device in the second piconet according to the determination result;
wherein the switching step comprises switching from the first piconet to the second piconet when there is no buffered data to be transmitted to the peer device in the first piconet and at least one packet exchange is completed.

10. A Bluetooth device, comprising:

a radio module, for transmitting data to a peer device in a first piconet; and a control unit, for determining whether there is buffered data to be transmitted to the peer device in the first piconet, and controlling the radio module to switch to a second piconet to transmit data to a peer device in the second piconet according to the determination result;

wherein the control unit switches from the first piconet to the second piconet when there is no buffered data to be transmitted to the peer device in the first piconet and at least one packet exchange is completed.

* * * * *